(12) United States Patent
Addink et al.

(10) Patent No.: US 6,950,728 B1
(45) Date of Patent: Sep. 27, 2005

(54) INTERACTIVE IRRIGATION SYSTEM

(75) Inventors: John Addink, Riverside, CA (US);
Tony Givargis, Anaheim, CA (US)

(73) Assignee: Aqua Conservation Systems, Inc., Riverside, CA (US)

( * ) Notice: Subject to any disclaimer, the term of this patent is extended or adjusted under 35 U.S.C. 154(b) by 23 days.

(21) Appl. No.: 10/031,046

(22) PCT Filed: Aug. 17, 2000

(86) PCT No.: PCT/US00/22673

§ 371 (c)(1),
(2), (4) Date: Jan. 11, 2002

(51) Int. Cl.[7] .......... G05D 7/06; G05B 11/01; A01G 25/00
(52) U.S. Cl. .......... 700/284; 137/78.2; 239/69
(58) Field of Search .......... 239/69, 71, 72, 239/99; 700/284, 9, 19; 137/78.2

(56) References Cited

U.S. PATENT DOCUMENTS

| | | | |
|---|---|---|---|
| 4,396,149 A | 8/1983 | Hirsch | 239/63 |
| 4,626,984 A | 12/1986 | Unruh et al. | 700/3 |
| 5,208,855 A * | 5/1993 | Marian | 239/69 |
| 5,479,339 A | 12/1995 | Miller | 700/16 |
| 5,647,986 A * | 7/1997 | Nawathe et al. | 210/608 |
| 5,760,706 A | 6/1998 | Kiss | 340/825.69 |
| 5,870,302 A * | 2/1999 | Oliver | 700/11 |
| 6,076,740 A | 6/2000 | Townsend | 239/1 |
| 6,343,255 B1 * | 1/2002 | Peek et al. | 702/3 |
| 6,402,048 B1 * | 6/2002 | Collins | 239/63 |
| 6,437,692 B1 * | 8/2002 | Petite et al. | 340/540 |
| 6,529,589 B1 * | 3/2003 | Nelson et al. | 379/102.01 |

FOREIGN PATENT DOCUMENTS

WO    WO 0122177 A1 *    6/2003

OTHER PUBLICATIONS

Press Release, Industry Leaders Join 3COM To Showcase Award-Winning Palm Computing Platform at COMDEX, Nov. 16, 1998.*

Palm Web Site page, Skytel Paging available for the Palm VII, May 28, 1999.*

* cited by examiner

Primary Examiner—Paul Rodriguez
(74) Attorney, Agent, or Firm—Rutan & Tucker, LLP

(57) ABSTRACT

An interactive irrigation system exchanges information between an irrigation controller and a distal computer, between the irrigation controller and a user, between the user and the distal computer, and between the distal computer and a third party. The information is preferably exchanged over an Internet communication system. The exchanged information includes the following: irrigation scheduling; quantity of water applied to the landscape at the user location, which is compared to ETo values; warnings to users when potential problems with their irrigation systems are detected; and other irrigation information that is useful to the user or a third party.

22 Claims, 3 Drawing Sheets

List of the Four Communication Systems Used for the Exchange of Information

| | | |
|---|---|---|
| 1 | First Communication System | Exchange Information Between the Irrigation Controller and the Distal Computer |
| 2 | Second Communication System | Exchange Information Between the Irrigation Controller and the User |
| 3 | Third Communication System | Exchange Information Between the User and the Distal Computer |
| 4 | Fourth Communication System | Exchange Information Between the Distal Computer and the Third Party |

Figure 1

INTERACTIVE IRRIGATION SYSTEM

FIELD OF THE INVENTION

The field of the invention is irrigation systems.

BACKGROUND OF THE INVENTION

In arid areas of the world water is becoming one of the most precious natural resources. Meeting future water needs in these arid areas may require aggressive conservation measures. This in turn requires irrigation systems that apply water to the landscape based on the water requirements of the plants. Many irrigation controllers have been developed for automatically controlling application of water to landscapes. Known irrigation controllers range from simple devices that control watering times based upon fixed schedules, to sophisticated devices that vary the watering schedules according to local geography and climatic conditions.

With respect to the simpler types of irrigation controllers, a homeowner typically sets a watering schedule that involves specific run times and days for each of a plurality of stations, and the controller executes the same schedule regardless of the season or weather conditions. From time to time the homeowner may manually adjust the watering schedule, but such adjustments are usually only made a few times during the year, and are based upon the homeowner's perceptions rather than the actual watering needs. One change is often made in the late spring when a portion of the yard becomes brown due to a lack of water. Another change is often made in the late fall when the homeowner assumes that the vegetation does not require as much watering. These changes to the watering schedule are typically insufficient to achieve efficient watering.

More sophisticated irrigation controllers usually include some mechanism for automatically making adjustments to the irrigation run times to account for daily environmental variations. However, due to the complexity of these irrigation controllers, the homeowner, after the irrigation controller is initially installed, makes few if any changes to the irrigation controller settings and may not even check if the irrigation controller is operating properly unless the landscape plant material begins browning and/or dying.

Additionally, since these irrigation controllers automatically operate the irrigation system the homeowner makes no preparation for someone to check the system when they are absent from their residence for an extended period of time, such as on a vacation. The irrigation controller is just a machine and for any number of reasons the irrigation controller may not continue to operate correctly, such as if the electricity to the residence is temporarily turned off.

Because of user disinterest and/or lack of knowledge in the operation of present automatic irrigation systems, there exists a need for a cost-effective method to assist the irrigation user in the attaining of more efficient irrigation of the landscape and in the regular monitoring of the operation of the irrigation system.

There are irrigation systems that are entirely or partly controlled by a distal computer that is located at a remote site from the irrigation controller. One such system disclosed in U.S. Pat. No. 5,208,855, issued May 1993, to Marian, broadcasts potential evapotranspiration (ETo) values for multiple geographic zones. Irrigation controllers receive and extract appropriate data for the local conditions, and then use the extracted data to calculate run times. However, there is no regular monitoring, other than by the user, of whether the irrigation controllers actually utilized and modified the irrigation schedule based on the broadcast ETo values. Another irrigation system disclosed in U.S. Pat. No. 5,696,671, issued December 1997, and U.S. Pat. No. 5,870,302, issued February 1999, both to Oliver, uses a central computer to compute a watering factor that is sent to the irrigation site to modify the watering schedule at the site. The watering factor is partially based on information the central computer receives from the irrigation site. As with the above patent, so also with this patent, there is no monitoring of whether the irrigation controller is applying the information transmitted from the central computer in the irrigating of the landscape.

A large irrigation system disclosed in U.S. Pat. No. 5,479,339 issued December 1995 to Miller, has management personnel located remote from the irrigation site and operators located at the irrigation site. Information is transmitted from the irrigation site to management personnel so they can monitor the quantity of water that is applied at the irrigation site. Irrigation systems such as these are either to large or their cost would prohibit their use on residential sites and smaller commercial landscape sites.

In addition to the above listed problems with existing known irrigation systems, there are also no known irrigation systems that communicate with the user on how efficient their irrigation system is operating and/or provide them with information on how they can improve the efficiency in the operation of their irrigation systems.

Current computer technology allows information to be electronically transmitted between two computers. Also, computers at remote locations are being used to control some types of devices. One such system disclosed in U.S. Pat. No. 6,053,844, issued April 2000, to Clem uses a computer at a remote site to directly control a fitness device via an Internet system. The user of the fitness device can also interact on-line with a fitness expert to engage in real time two way communications.

The present invention uses a distal computer at a remote site to assist the irrigation user in attaining more efficient irrigation of the landscape and the distal computer, at the remote site, monitors the operation of the irrigation system. In a preferred embodiment of the present invention the distal computer, at the remote site, communicates with an irrigation controller at the user's site, with the user, and with a third party via the Internet system.

SUMMARY OF THE INVENTION

In various aspects of the invention, an irrigation system exchanges information between an irrigation controller and a distal computer, between the irrigation controller and a user, between the user and the distal computer, and between the distal computer and a third party.

In preferred embodiments at least one of the first, second, third, and fourth communication systems may comprise a public, packet switched network such as the Internet. More preferably more than one, or even all of the one of the first, second, third, and fourth communication systems comprises such a network. In still other embodiments, the second communication system may advantageously comprise a direct, hard-wired link. Exchange of information may be bi-directional.

In especially preferred embodiments a microprocessor is disposed in the irrigation controller at the user location, and is programmed for transmitting information, receiving information, and controlling operation of the irrigation controller.

The information transmitted among two or more of the user, controller, distal computer, and third party may advantageously include water usage data, weather data, actual water ETo data, and so forth. ETo may be provided to the controller, or calculated or estimated by the controller.

The microprocessor in the controller may advantageously be programmed to detect problems with the irrigation. This is preferably accomplished by setting one or more parameters within which the irrigation system should operate. If the operation of the irrigation system falls outside of the parameters, a warning may be sounded to the user, distal computer, or third party. Severe problems may result in shut down of one or more aspects of the irrigation system.

In yet another aspect of preferred systems, the user may be able to obtain information regarding the irrigation system from the distal computer. Such Information may include operating parameters such as irrigation run times, irrigation water flow data, irrigation water pressure data, and computed parameters such as computed ETo, total water applied to the landscape during a specified time period, percent of ETo actually applied, and educational information on water conservation. Similar information may be made available to a water district or other third party.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWINGS

FIG. 1 is a list of four communication systems

DETAILED DESCRIPTION

Figure 2:
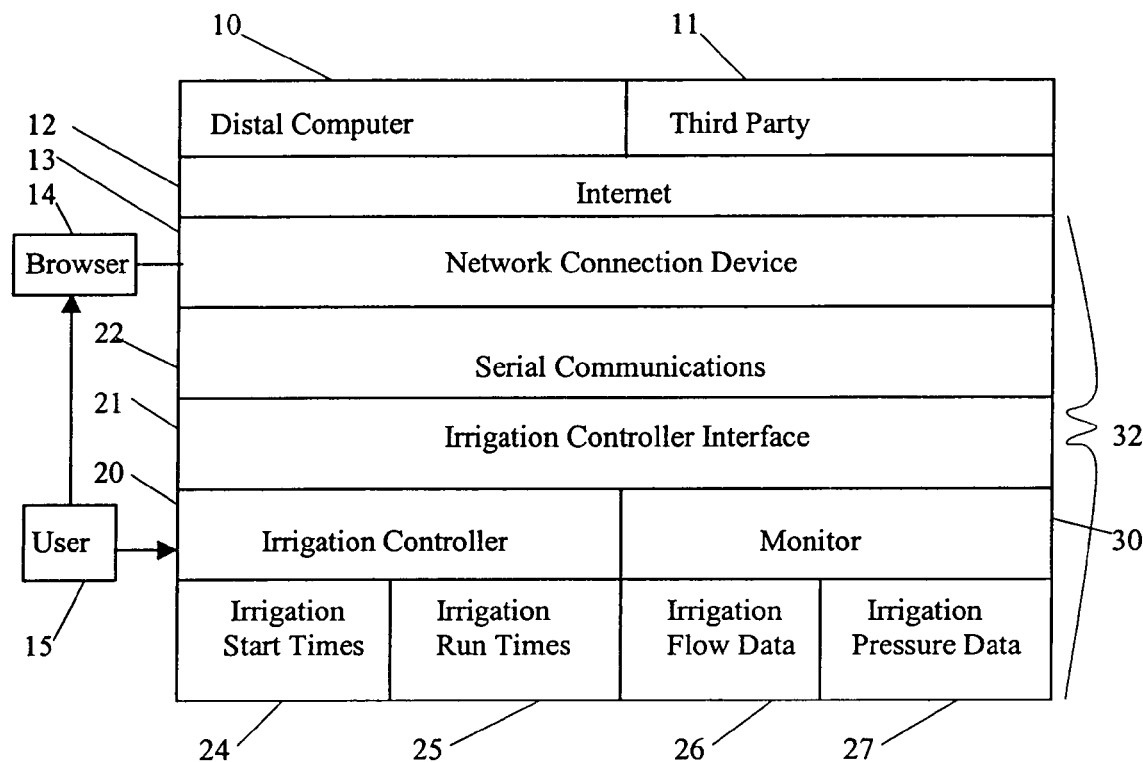
FIG. 2 is a schematic representation of an interactive irrigation system according to the present invention.

As used herein, an "irrigation controller" is a physical device that controls operation of one or more water application devices according to a schedule, and is situated locally (i.e., within 1 kilometer (km) of any of the water application devices being controlled). The term "user" is taken to mean a natural person who has at least some interaction with the irrigation controller, and is situated locally to the controller during a relevant time period. "Water application devices" are physical devices that distribute water to plants. Typical water application devices are sprinklers, drippers, sprayers, and so forth. The term "remote" with respect to an irrigation controller is taken to mean more than 1 km away from the irrigation controller. The term "third party" is used herein to mean a legal person other than the user. A third party need not be a physical person, and may well be a water district or other government agency.

The term "communication system" is used in a very broad sense herein to mean any system used to communicate information. Contemplated communication systems may be analog or digital, the information may be carried by wires, radio waves, infra-red, light, sound, or any other energy waves, packet switched or not, involve dedicated or non-dedicated lines, may be public or private, or any combination of these. Bi-directional communication systems may or may not be duplex (i.e. carrying signals in both directions at the same time). Contemplated communication systems may use any appropriate hardware. For example, communication between an irrigation controller and a user may employ a key pad for entering data into the irrigation controller, and an LED display for transmitting information from the irrigation controller to the user. Alternatively, sound may be used, such as where a user provides information to the irrigation controller using voice, and the irrigation controller talks to the user using synthesized speech. In yet other embodiments, a user may communicate with an irrigation controller located in the garage of a personal residence, through a personal computer (PC) type keyboard and display screen located in a bedroom of the residence. The link may be hard wired, or it may utilize any other suitable connection, such as the public, packet switched network known as the Internet. Storage devices may again be any suitable information storage, including hard drive, floppy disk, RAM, ROM, and so forth.

The term "personal computer" means any general purpose computing device that is capable of running at least word processing, either from a local source or from an application service provider. Examples are a desk top or laptop computers, very thin clients such as Internet TV, and relatively low capacity equipment such as Palm Pilot™ or other hand-held computers.

FIG. 1 shows four communication systems that exchange information in preferred embodiments of the present invention. The first communication system exchanges information between an irrigation controller and a distal computer. The second communication system exchanges information between the irrigation controller and a local user. The third communication system exchanges information between the user and a distal (also referred to as a "host" computer). The fourth communication system exchanges information between the distal computer and a third party. All of these communication systems are preferably bi-directional. Any suitable communication language can be used to communicate information across any of the communication systems.

Under the definitions set forth herein, aspects of some of these communications systems are already known. For example, it is already known to bi-directionally exchange some types of information between an irrigation controller and a distal computer, and between the irrigation controller and the user. However, both the exchange of irrigation information between the distal computer and the user, and between the distal computer and a third party are thought to be novel for irrigation systems.

FIG. 2 is a schematic representation of an interactive irrigation system according to the present invention. The distal computer 10 of FIG. 1 is interactively connected to an irrigation controller 20 at a user's location 32 via the first communication system 1. The first communication system 1 is preferably an Internet system, but may alternatively or additionally comprise some other type of communication system such as a telephone system, a radio system, a pager system, two-way pager system, or any other suitable system. An irrigation controller interface 21 is provided for coupling the irrigation controller 20 to the network connection device 13 via a serial communications 22. The network connection device 13 can be a network computer, a personal computer, a cable television box, or any other suitable connection device. Information is preferably transmitted between the irrigation controller interface 21 and the network connection device 13 through a serial communication channel 22.

The first communication system 1 permits the distal computer 10 to transmit control information to the irrigation controller 20. The control information may include irrigation start times 24, irrigation run times 25, and contingency rules that prevent the irrigation controller 20 from operating upon detection of one or more problem conditions. The control information is preferably derived from information inputted, received and/or stored in the distal computer 10. The first communication system 1 also permits the irrigation controller 20 to transmit irrigation information to the distal computer 10. Such information may advantageously include irrigation water flow data 26 and water pressure data 27, which may be displayed on the monitor 30 of the distal computer 10.

The second communication system 2 allows the user 15 to communicate with the irrigation controller 20. Since both user 15 and controller 20 are local, this could advantageously be accomplished through a keypad 233 physically located on the irrigation controller 20 (See FIG. 3), or in some manner hard wired to the controller 20. Other systems are, however, also contemplated. It is especially contemplated that the user 15 could communicate with the irrigation controller 20 using a desktop computer or laptop computer. Such embodiments may be well appropriate where the controller 20 is in a barn or garage, and the user 15 is operating the controller 20 from within a nearby house or office.

The third communication system 3 is used to transfer information between the user 15 and the distal computer 10, and may also advantageously comprise an Internet system. To this end the user 15 may employ a computer, for example, a personal computer 13 with an Intel Pentium processor and a fast modem. An Internet browser 14 is preferably coupled to the personal computer 13, and is used to provide interactive connection with the distal computer 10. Among other things, the user 15 may input relatively fixed landscape irrigation operating information such as the size, drainage, crop layout, and so forth, and relatively variable landscape irrigation operating information such as irrigation water flow data 26 and water pressure data 27.

The distal computer 10 may advantageously combine the landscape irrigation information with other types of information to derive an irrigation schedule to be downloaded into the irrigation controller 20. Such additional information may include one or more of daily weather data and/or historic ETo values from the user's site or a site with similar meteorological conditions, daily irrigation water flow data 26, and daily irrigation water pressure data 27. It is especially contemplated that the irrigation schedule will be designed to provide efficient irrigation of the landscape with a minimum waste of water. This may involve comparing a computed quantity of water that was applied to the landscape at the user location against an ETo value for that landscape. Differences in these values may be stored, and made available to the user 15 and third parties 11.

The distal computer 10 may also be programmed to detect problems with the irrigation system at the user location 32. This can be accomplished by setting parameters within which the irrigation system, at the user location 32, is determined to be operating effectively. If operation of the irrigation system falls outside of one or more of the parameters, this indicates that a problem with the irrigation system may exist. For example, if the total quantity of water to be applied to the landscape during each scheduled irrigation is determined to be approximately 100 gallons, then upper and lower threshold parameters for total water application could be set at 90 gallons and 110 gallons, respectively. A problem with the irrigation system would be indicated if the quantity of water, applied during any scheduled irrigation, was less than 90 gallons or more than 110 gallons. A lower than normal quantity of applied irrigation water could indicate plugged heads, and a higher than normal quantity of applied irrigation water could indicate broken irrigation lines or sprinkler heads. If problems with the irrigation system at the user location 32 are detected, then the distal computer 10 may warn the user 15 using a visible or audible signal, and/or send control commands to the irrigation controller 20 to prevent the irrigation controller 20 from operating.

Due to cost or for other reasons, presently installed irrigation controllers may not be able to be interactively coupled with the distal computer 10. In such cases it is contemplated that the third communication system may at least partially substitute for the first communication system. For example, it is contemplated that a user 15 may obtain the irrigation schedule from the distal computer 10 through the third communication system 3, and program the irrigation controller 20 directly using the second communication system 2. One scenario is for the user 15 to access the irrigation schedule using a browser program on personal computer 13 and a web site hosted by, or at least controlled by the distal computer 10. Such access can be protected by user identification code and password.

The fourth communication system 4 is used to provide information to a third party. The information thus provided may include operating information such as irrigation start times 24, irrigation run times 25, irrigation water flow data 26, irrigation water pressure data 27, total quantity of water applied to the landscape during a specified time period, and the percent the actual water applied to the landscape represents of the ETo value for the same time period. Where the third party is a water district, this information could be used for billing purposes, monitoring purposes, or for many other reasons. Educational information may travel in the other direction, from third party 11 to distal computer 10, and then on to the user 15, or from third party 11 directly to the user 15.

Figure 3:
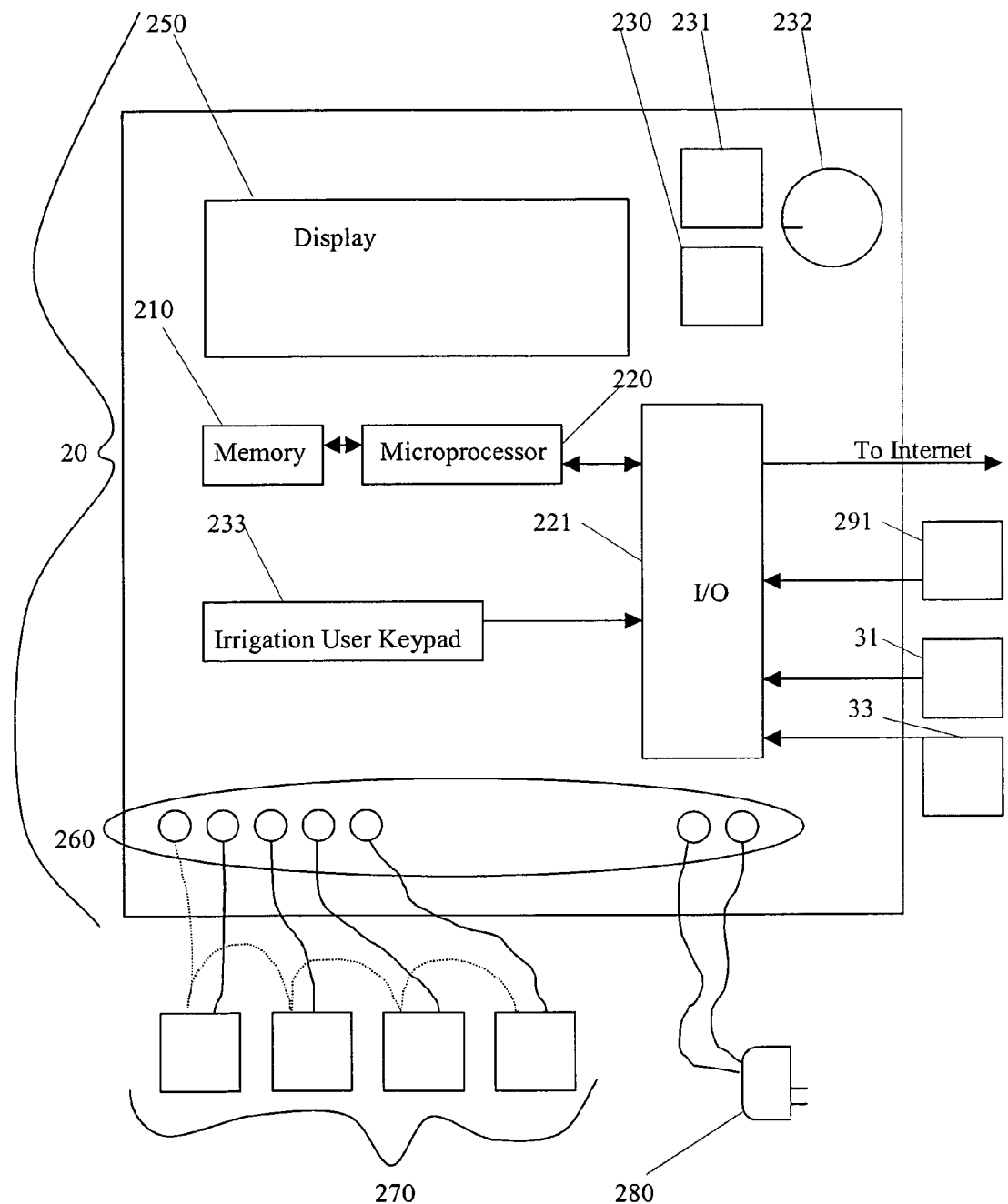
FIG. 3 is a schematic of an irrigation controller.

In FIG. 3 an irrigation controller 20 generally includes a microprocessor 220, an on-board memory 210, some manual input devices 230 through 232 (buttons and/or knobs), preferably an irrigation user keypad 233 for entering irrigation identifying information, an input/output (I/O) circuitry 221 connected in a conventional manner, a display screen 250, electrical connectors 260 which are connected to a plurality of irrigation stations 270 and a power supply 280, a rain detection device 291, a flow sensor 31, and a pressure sensor 33. Each of these components by itself is well known in the electronic industry, with the exception of the programming of the microprocessor in accordance with the functionality set forth herein.

A class of irrigation systems according to the present invention comprises an irrigation controller and a plurality of water application devices that are physically situated at a user's location. The controller at least partially controls the water application devices. A first communication system exchanges information between the irrigation controller and a distal computer, a second communication system exchanges information between the irrigation controller and the user, a third communication system exchanges information between the user and the distal computer; and a fourth communication system that exchanges information between the distal computer and a third party. At least one of these irrigation systems is preferably bi-directional, and in especially preferred embodiments all of these communication systems are bi-directional. At least one of the first, third, and fourth communication systems may advantageously comprise a public, packet switched network, and more preferably comprises an Internet connection that makes use of a web page interface. One or more of the communication systems may involve a dedicated link. One or more of the communication systems may involve a pager, and especially a two-way pager. Microprocessors are advantageously included in at least the irrigation controller and the distal computer to facilitate the communications. The microprocessor at the user location may operate a RAM, ROM, or other data storage device.

A class of inventive methods according to the present invention include physically situating each of an irrigation controller and a water application device at a user's location; utilizing the controller to at least partially control the water application device; coupling the irrigation controller and a distal computer using a first communication system; coupling the irrigation controller and the user using a second communication system; the user entering landscape irrigation operating information into the irrigation controller using the second communication system; and the irrigation controller causing at least a portion of the landscape irrigation operating information to be transmitted to the distal computer using the first communication system.

The controller may advantageously be provided with a microprocessor programmed to receive information from the distal computer and/or local water usage data from local sensors. An irrigation schedule may be determined by the microprocessor in the controller, a microprocessor in the distal computer, or any combination of the two. The irrigation schedule may advantageously involve computing a desired quantity of water to be applied to a landscape at the user's location for a day, week, month, or other specific period of time. Computations may also advantageously include computing an ETo value, and comparing ETo to the desired quantity of water to be applied to the landscape, and/or the actual water usage. Water usage may in turn be correlated with water pressure date.

Preferred methods may also include a third communication system that couples the user and the distal computer. More preferred methods may include a fourth communication system that couples the distal computer and a third party. The third party may thereby be apprised of many different types of information, including a calculated estimate of water actually applied at a station for a time period, and a relationship between the calculated estimate of water actually applied at a station for a time period and a computed ETo for the station for the time period.

Normal, or at least predetermined, operating parameters may be implemented with warnings being provided to the user or to third parties when operating conditions fall outside the normal parameters. In some instances one of the microprocessors may be used to prevent an operation of the irrigation system when the irrigation system falls outside of the predetermined parameters.

Thus, specific systems and methods of interactive irrigation systems have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. An irrigation system comprising:
   each of an irrigation controller and a water application device physically situated at a location of a user, the controller at least partially controlling the water application device; and
   a communication system that sends at least one of a start time, irrigation water flow data and irrigation water pressure data from the irrigation controller to a government agency wherein the communication system comprises a public packet switched network.

2. The irrigation system of claim 1, wherein the communications system consists of bi-directional communications.

3. The irrigation system of claim 1, further comprising a microprocessor disposed in the irrigation controller, that facilitates the sending of at least one of a start time, irrigation water flow data and irrigation water pressure data from the irrigation controller to the government agency.

4. The irrigation system of claim 1, further comprising a microprocessor disposed in a unit separate from the irrigation controller, that facilitates the sending of at least one of a start time, irrigation water flow data and irrigation water pressure data from the irrigation controller to the government agency.

5. The irrigation system of claim 1, further comprising a storage device that stores data at the user location.

6. The irrigation system of claim 1 wherein the communication system comprises a two-way pager.

7. The irrigation system of claim 1 wherein the communication system comprises a web page interface.

8. A method of operating an irrigation system comprising:
   physically situating each of an irrigation controller and a water application device at a location of a user;
   utilizing the controller to at least partially control the water application device;
   providing a first communication system comprising a public packet switched network;
   coupling the irrigation controller and a government agency using the first communication system; and
   sending at least one of a start time irrigation water flow data, and irrigation water pressure data from the irrigation controller to the govenment agency.

9. The method of claim 8, further comprising a step of the user entering landscape irrigation operating information into a personal computer, and the personal computer transmitting the landscape irrigation information to the irrigation controller via a second communication system.

10. The method of claim 8, further comprising:
    providing the controller with a microprocessor programmed to receive additional information from a distal computer via a second communication system; and
    the microprocessor determining an irrigation schedule based at least in part on landscape irrigation operating information from the user, and the additional information from the distal computer.

11. The method of claim 10, further comprising:
    providing the controller with local water usage data; and
    the microprocessor determining an irrigation schedule based at least in part on the water usage data.

12. The method of claim 11 wherein the step of determining an irrigation schedule further includes the microprocessor computing a desired quantity of water to be applied to a landscape at the user's location for a specific period of time.

13. The method of claim 12 wherein the period of time is at least one day.

14. The method of claim 10 wherein the additional information from the distal computer includes weather data, and further comprising the microprocessor computing an ETo value.

15. The method of clam 14 further comprising the microprocessor comparing the ETo value to a desired quantity of water applied to the landscape.

16. The method of claim 8, further comprising coupling the user and a distal computer using a third communication system.

17. The method of claim 8 further comprising a microprocessor sending a warning to the user via a second communication system when an aspect of the irrigation system falls outside of a predetermined parameter.

18. The method of claim 8 further comprising a microprocessor preventing an operation of the irrigation system when the irrigation system falls outside of a predetermined parameter.

19. The method of claim 8, further comprising a step of transmitting information to a distal computer such information comprising a calculated estimate of water actually applied at a station for a time period.

20. The method of claim 19 wherein the information transmitted to the distal computer further includes a relationship between the calculated estimate of water actually applied at a station for a time period, and a computed ETo for the station for the time period.

21. The method of claim 8, further comprising sending information from a distal computer to the government agency, such information including irrigation operating information.

22. The method of claim 21, wherein the irrigation operating information includes at least one of an irrigation start time, an irrigation run time, an irrigation water flow value, and an irrigation water pressure value.

* * * * *